Oct. 6, 1959 G. STRIEGL 2,907,307
COMBINED MOTOR AND/OR MOTOR APPARATUS
Filed Aug. 27, 1958

INVENTOR
GEORGE STRIEGL
BY: *Frederick E. Brawley*
ATTORNEY

United States Patent Office 2,907,307
Patented Oct. 6, 1959

2,907,307

COMBINED MOTOR AND/OR MOTOR APPARATUS

George Striegl, Hamilton, Ontario, Canada

Application August 27, 1958, Serial No. 757,555

2 Claims. (Cl. 123—16)

My invention relates in general to prime movers and in particular to a combination motor and compressor engine of a novel construction. The engine is of the rotary type and includes firing and compressing chambers. It is adapted for use as a compressor, a motor or combined motor-compressor. In its employment as a motor it is well suited as a driving agency for tools and machines. It is ideal for such equipment as pumps, generators and power tools that require an even output of energy. It may be used as a power plant for automobiles and other automotive vehicles and to this end it may be equipped with a clutch and suitable transmission installed in the vehicle and if so desired could be mounted in a road wheel of a vehicle in which case the conventional differential could be dispensed with, also the ordinary power transmission shaft.

A distinctive feature of the engine is that it is very compact and light in weight; moreover, it is possessed of few moving parts and therefore is highly durable and serviceable. Repairs may be easily made if necessary and generally speaking it presents a highly serviceable improved internal combustion engine.

A selected embodiment of the invention is illustrated in the accompanying drawing, in which.

Figure 1:
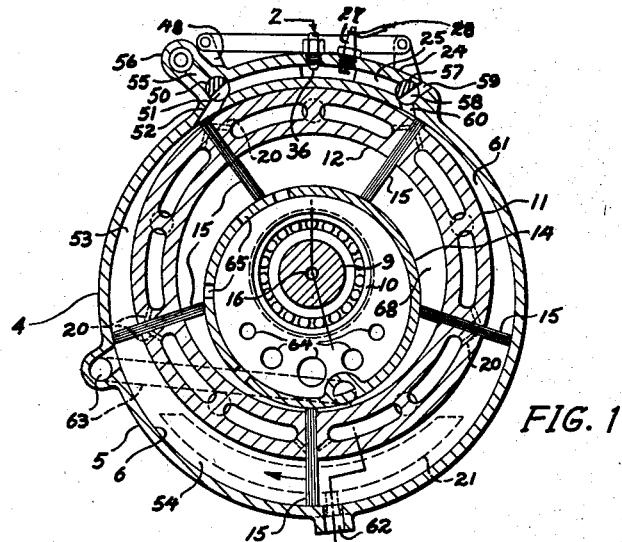
Fig. 1 is a sectional elevation showing the apparatus as a combined motor and compressor.

As shown in the drawing, the rotary motor is of the internal combustion type, comprising a housing generally denoted by the reference numeral 4 which is a stationary member and is intended to be suitably mounted on a support in approved manner. The housing has a cylindrical wall 5 presenting a bore 6 which is circular and shown as closed at one end by an end wall 7. The opposite end is closed by a detachable plate 8 which is secured by suitable fastening elements of a conventional pattern. The radial wall 7 is a plate-forming wall which may of course be made detachable according to dictates of manufacture.

Journalled in the end plates is a shaft 9 which extends through the housing and projects therebeyond to provide for power take-off from at least one of its ends. The shaft is journalled in the end plates 7 and 8, preferably by suitable anti-friction bearings indicated at 10 which are shown as radial ball bearings. The shaft is mounted eccentrically of the axis of the housing and at the upper side of said axis. On the shaft and rotatable therewith is a rotor 11 which comprises a hollow cylindrical part 12 and a radial wall 13 at one end thereof and engaged with the end wall 7 of the housing in bearing contact. The other end of the cylindrical part 12 has heating contact with the end wall 8 of the housing. The rotor is concentrically mounted on the shaft 9 to turn therewith and its outside diameter is dimensioned to have tangential contact with the bore 6 of the housing. By reason of the center of the shaft being located in a vertical plane containing the horizontal axis of the housing and spaced above said axis, the tangential contact of the rotor with the bore of the housing is directly overhead the shaft and there is provided a crescent-shaped space between the rotor and the bore of the housing.

Internally of the rotor and of a less diameter than its internal diameter there is provided a fixed ring 14 which is concentric with the bore of the housing and therefore eccentrically disposed with respect to the rotor. The ring is integral with or secured to the end plate 8 of the housing and extends axially to the radial part 13 of the rotor as shown in Fig. 2.

The rotor is supplied with a plurality of radial blades 15 which have seating contact at their outer ends with the bore of the housing and have seating contact at their inner ends with the ring 14. The blades are equidistantly spaced and are slidable radially in the rotor in the rotation thereof. Preferably there are five such blades, each made up of a number of plates, there being for example, four plates to each blade.

The rotor is desirably supplied with a cooling system in which a coolant is circulated from an external cooler and cleaner of a conventional character, not shown since it does not per se form a part of the present invention. Oil is used as the coolant and the system comprises a central oil passage 16 within shaft 9 extending from a source of supply under pressure. Intersecting the passage and communicating therewith are radial passages provided in the shaft as indicated at 17 which communicate with aligned passages 18 radially directed and provided in the wall portion 13 of the rotor. These radial passages communicate with longitudinal passages 19 supplied in the hollow cylindrical portion 12 of the rotor and terminated in closed ends. The passages 19 are cooling passages and leading off such passages are lubricating passages 20 which feed oil to the blades for the lubrication thereof. At the lower part of the housing 4, there is provided an oil well 21 having a passage 22 communicating with the passages 19 of the rotor by which oil may drain off from the rotors to the well, hence to an oil outlet 23 forming part of the cooling system which will be well understood in the art.

Figure 2:
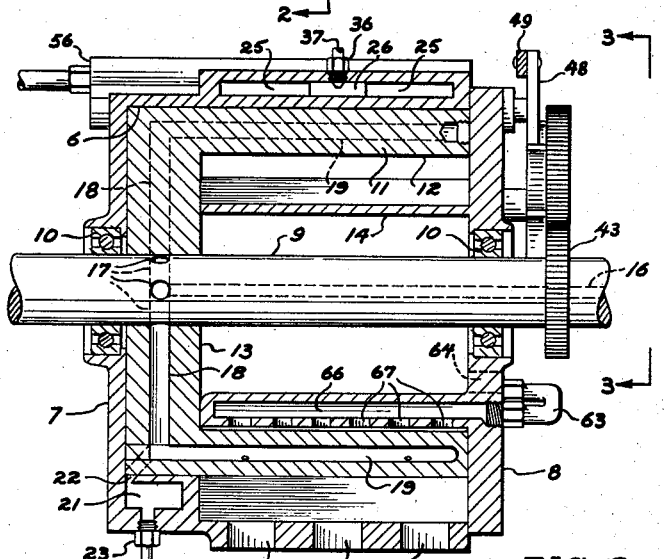
Fig. 2 is a sectional view taken on line 2—2 of Fig. 1.

At the top of the housing 4 there is provided a chamber-forming wall 24 which supplies a firing chamber 25 which is divided into two sections by an intervening web portion 26—Fig. 2. The combustion chamber 25 is supplied with a spark plug 27 which forms a part of the ignition system of a known type having a wire 28 electrically connected to a standard make and break device 29 supplied with a contact arm 30 for the contacts 31 and spring-pressed as at 32. A rocker 33 is pivotally mounted as at 34 on plate 8 and has a cam piece 35 for operation of the contact arm 30.

Figure 3:
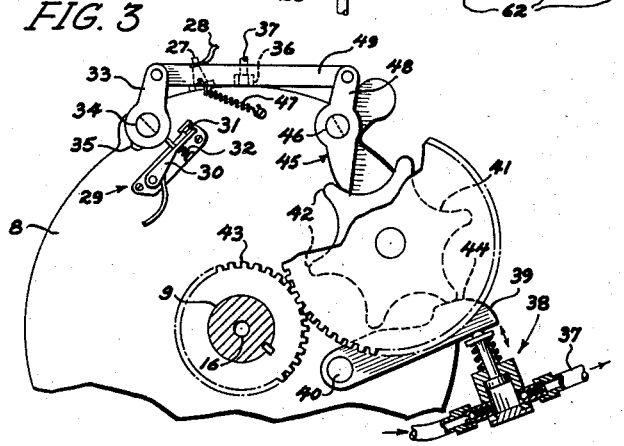
Fig. 3 is a fragmentary end view taken on the line 3—3 of Fig. 2.

Fuel is injected into the combustion chamber 25 by an injector 36 having a fuel line 37 extending to and connected with an ordinary pump device 38—Fig. 3. This pump device is supplied with an actuator in the form of a cam finger 39 pivoted at 40 and engaged with a star wheel 41 having teeth 42 shown as six in number and driven by meshing spur gears 43, one of which is secured on the shaft 9. The star wheel is rotated in clockwise direction and as each tooth comes in contact with the cam face 44 on the cam finger 39 it imparts an actuating movement to the fuel pump for an injection of fuel into the combustion chamber for a firing operation.

The star wheel 41 operates a wiper cam 45 which is pivoted at 46 and spring-pressed to normal position by a spring 47. A lever part 48 of the wiper cam has a connection by means of a link rod 49 to the member 33 so that an injection of fuel is followed by a firing operation. This timing mechanism will be clearly understood from an inspection of Fig. 3. Now, adverting to the combustion chamber 25, there is provided therein a cylindrical valve 50 which is seated therein to oscillate about an axis and is extended outwardly of the wall 24 of the combustion chamber at one end and is secured to the rocker element 48 so as to be turned thereby through a suitable angle of rotation in the order of 90 degrees. This rotary valve is cut away to provide a passage 51 at one side thereof and in one extreme position of the valve it places the combustion chamber in communication with a port 52 which in turn communicates with the part 53 of the air compression chamber 54. Port 52 is for intake of air into the combustion chamber, the air being placed under compression by rotation of the rotor and the veins in clockwise direction. Moreover in another position of the valve 50 the port 52 is placed in communication with a duct 55 through which compressed air is delivered to a receiver, not shown as it does not form a part of the invention. The receiver may have a line connection with the part 56. In another position of the valve 50 it closes off the combustion chamber with respect to the port 52 for a firing operation.

The combustion chamber 25 is also supplied with a cylindrical valve 57 opposite that aforesaid and cut away at one side to provide a passage 58 into which the valve in one position places the combustion chamber in communication with an air inlet 59 communicating with the atmosphere. In another position of angular rotation this valve places the combustion chamber in communication with a port 60 which is an outlet duct for discharge of products of combustion into the portion 61 of the air compression chamber 54. This valve has an end part projecting outside the wall 24 of the combustion chamber which provides the pivot 34 on which the rocker member 33 is secured. It will be understood that by this arrangement the member 33 serves to oscillate a cylindrical valve 57 and likewise the member 48 serves to oscillate the valve 50. It will be further understood that when an explosion takes place in the combustion chamber and the valve is turned to place it in communication with the port 60 the hot gases of combustion will be conducted to a portion of the compression chamber indicated at 61 and will act on the blade at that zone with a driving action causing it to rotate the rotor and as the rotor is carried around the spend gases of combustion will be discharged through an outlet 62. The blade in continuing its movement serves to compress air as it is carried towards the combustion chamber. In this way the rotor acts to compress air in its different phases according to the impulses received from explosions occurring in the combustion chamber.

The passage 62 is also an air inlet and in addition to the air intakes 52, 59 and 62 there are provided the further air intakes 63, 64 and 65. The air intake 63 has a continuation passage 66 provided with openings 67 leading to and communicating with the inner compression chamber indicated at 68. It will be understood that atmospheric air is admitted into the interior of the ring 14 through the openings 64 and drawn into the inner compression chamber 68 through the hole 65 thus conducted under pressure through the passage 66 to the inlet 63 which introduces the compressed air to the outer compression chamber 54 to augment the compression of air therein.

Additional to the outlets indicated at 55, 59 and 62 the passage 66 may also be considered an outlet and functions as such.

It is believed that the construction and arrangement of the engine will be fully understood from the preceding description. It will be understood that the engine can be started manually. A 72 degree right turn draws air through the intakes 62, 59, 64 and 65. Compressed air enters the combustion chamber 25 through the port 52 as already recounted. Compressed air from the inner side of the rotor conducted to the outer side thereof by the passages 65 and 66. Valves 50 and 57 have an angular movement of 90 degrees to the right and fuel is injected through the nozzle 36. Spark plug 27 ignites the air-fuel mixture. The resulting high explosive pressure pushes the blade effected until a portion of the rotor reaches the exhaust 62. Air under pressure from the compression side of the rotor is delivered by the passage 55 to a receiving vessel connected thereto. Fuel injection and ignition take place every angular movement of 140 degrees on the part of the rotor.

Having described and ascertained a selected embodiment of the invention, it will be manifest that such changes and modifications may be resorted to as come within the scope of the appended claims.

What I claim is:

1. Apparatus as set forth comprising a stationary housing having a cylindrical portion presenting an annular bore and having radial end walls, a shaft journalled in said end walls and extending through said housing eccentrically of said bore, a rotor within said housing having a cylindrical portion and an end radial wall, said end radial wall serving to concentrically mount said rotor on said shaft for rotation as a unit therewith and having bearing contact with an adjacent said end wall of said housing, said cylindrical portion of said rotor having an external diameter of a dimension to make tangential contact with said bore in seating relation and having an end face remote from said end radial wall of said rotor and in bearing engagement with the other said radial end wall of said housing, said rotor providing with said bore an outer crescent-shaped compression chamber, a ring mounted on this other said radial end wall of said housing and extending inwardly of said rotor concentric with said shaft and providing an inner crescent-shaped compression chamber jointly with said cylindrical portion of said rotor, a plurality of circumferentially spaced radial blades slidably mounted in said cylindrical portion of said rotor with their outer ends bearing against said bore of said housing and their inner ends bearing against said ring, means for exerting a driving force on said rotor, and inlet and outlet means for said inner and outer crescent-shaped compression chamber including valve control means, the aforesaid structure characterized in that there is provided a cooling system comprising passages in said shaft and said rotor for circulation of a coolant in the form of a lubricating liquid, said passages in said rotor including comparatively small holes leading to said blades for the lubrication thereof.

2. Combined motor and/or compression apparatus comprising a stationary housing having a cylindrical portion presenting an annular bore and having radial end walls, a shaft journalled in said end walls and extending through said housing eccentrically of said bore, a rotor within said housing having a cylindrical portion and an end radial wall, said end radial wall serving to concentrically mount said rotor on said shaft for rotation as a unit therewith and having bearing contact with an adjacent said end wall of said housing, said cylindrical portion of said rotor having an external diameter of a dimension to make tangential contact with said bore in seating relation and having an end face remote from said end radial wall of said rotor and in bearing engagement with the other said radial end wall of said housing, said rotor providing with said bore an outer crescent-shaped compression chamber, a ring mounted on this other said radial end wall of said housing and extending inwardly of said rotor concentric with said shaft and providing an inner crescent-shaped compression chamber jointly with said cylindrical portion of said rotor, a plurality of circumferentially spaced radial blades slidably mounted in said cylindrical portion of said rotor with their outer ends bearing against said bore of said housing and their inner ends bearing against said ring, a combustion-chamber forming wall on said cylindrical portion of said housing at the zone of tangency of said rotor with said bore, an ignition system for said combustion chamber including a spark plug in said wall thereof, fuel-injecting means for said combustion chamber, inlet and outlet means for said inner and outer crescent-shaped compression chambers and for said combustion chamber; an intake port for intake of air from the outer compression chamber to the combustion chamber, and an exhaust port leading from the combustion chamber to the outer compression chamber; and valve control means for said intake and exhaust valves including a lever element on one of the valves and a rocker device on the other valve, a link rod connecting said lever element to said rocker device, a wiper cam on said rocker device, a star wheel pivotally supported and having teeth which successively engage said wiper cam in the rotation of said star wheel, and gearing connecting said star wheel to said rotor shaft.

References Cited in the file of this patent

UNITED STATES PATENTS

| | | |
|---|---|---|
| 659,007 | Tinkham | Oct. 2, 1900 |
| 1,482,807 | Newberg | Feb. 5, 1924 |
| 2,180,352 | Fahrney | Nov. 21, 1939 |

FOREIGN PATENTS

| | | |
|---|---|---|
| 2,889 | Great Britain | 1805 |